United States Patent [19]
Booth et al.

[11] Patent Number: 5,718,513
[45] Date of Patent: Feb. 17, 1998

[54] TEMPERATURE-INDICATING DEVICE

[75] Inventors: Derek Booth; Russell Booth, both of Burton; Stephen Preston, Prenton; Kevin Guilliatt, Halesowen, all of United Kingdom

[73] Assignee: Thermographic Measurements Limited, United Kingdom

[21] Appl. No.: 563,980

[22] Filed: Nov. 29, 1995

[30] Foreign Application Priority Data

Jun. 21, 1995 [GB] United Kingdom ............ 9512667

[51] Int. Cl.⁶ .......... G01K 11/12; G01K 1/14; G01K 1/16; G01K 13/00
[52] U.S. Cl. .......... 374/162; 374/141; 374/134; 374/120; 116/216; 116/207
[58] Field of Search .......... 374/134, 120, 374/141, 162; 116/216, 207

[56] References Cited

U.S. PATENT DOCUMENTS

| | | | |
|---|---|---|---|
| 1,652,838 | 12/1927 | Rider | 374/134 |
| 1,728,907 | 9/1929 | Rider | 374/134 |
| 2,282,441 | 5/1942 | Whitlock | 374/134 |
| 3,095,743 | 7/1963 | Teasel et al. | 374/134 |
| 3,247,714 | 4/1966 | Schwabe et al. | 374/134 |
| 4,538,926 | 9/1985 | Chretien | 374/162 |
| 4,859,360 | 8/1989 | Suzuki et al. | 374/162 |

FOREIGN PATENT DOCUMENTS

| | | | |
|---|---|---|---|
| 0305271 | 3/1989 | European Pat. Off. | 374/120 |
| 3048361 | 7/1982 | Germany | 374/134 |
| 2010190 | 3/1994 | Russian Federation | 374/134 |
| 0808871 | 3/1981 | U.S.S.R. | 374/134 |
| 1326910 | 7/1987 | U.S.S.R. | 374/162 |

*Primary Examiner*—Diego F. F. Gutierrez
*Attorney, Agent, or Firm*—William Nitkin

[57] ABSTRACT

A temperature-indicating device for use with a barrier having a first side and an opposite second side, the device including a temperature sensitive means located at the first side of the barrier, a thermal conductor for transferring heat from the second side of the barrier to the temperature sensitive means, and a temperature indicator disposed on the first side of the barrier, the temperature indicator for indicating on the first side of the barrier a change in temperature occurring on the second side of the barrier.

8 Claims, 2 Drawing Sheets

TEMPERATURE-INDICATING DEVICE

BACKGROUND OF THE INVENTION

1. Field of the Invention

The device of this invention resides in the area of temperature-indicating devices and more particularly relates to a temperature-sensing and display device for installation through a door or other barrier to indicate on one side thereof whether the temperature on the other side has reached a predesignated level.

2. Description of the Prior Art

It is often difficult to determine the presence of heat beyond a barrier without actually gaining access thereto. In situations where, for example, there is a fire on the other side of a door, if such door is opened, it can allow the fire to spread, causing possible damage and injury.

SUMMARY OF THE INVENTION

It is an object of this invention to provide a temperature-sensing and indicating device for detecting predetermined temperature level(s) on one side of a barrier from the other side of the barrier.

It is a further object of this invention to provide a temperature-indicating device which is inexpensive and maintenance-free and which can also function as a conventional peephole.

According to the present invention there is provided a temperature-indicating device for indicating on a first side of a barrier, such as a door, wall or the like, the temperature on the other side of the barrier, the device comprising temperature sensitive means, a thermal conductor for transferring heat from the opposite side of the barrier to the temperature sensitive means, and a temperature indicator located on the first side of the barrier for indicating a change in temperature detected by the temperature sensitive means.

For example, the present invention provides a device that can indicate to a person on one side of a door the temperature level in a room beyond the door, without that person having to open the door. The device has particular application as a warning device to forewarn fire fighters, etc. of a rise in temperature from one room to the next. Clearly in such applications the device can be of great benefit as personal injury and the spread of a fire could in some circumstances be avoided by the forewarning thus provided.

It is to be understood, however, that there are other possible applications for the device of this invention. The device can be installed in any barrier, such as a wall, etc., to provide an indication to a person on one side of the barrier of the temperature on the opposite, perhaps inaccessible, side of the barrier.

For many applications, such as a warning device as discussed above, it will not be necessary to have a constant indication of the temperature across the barrier at any given time, but only an indication that the temperature on the opposite side of the barrier has increased above a predetermined level. Furthermore, it may not be necessary to specify the temperature level exactly, since for many applications absolute accuracy may not be required.

The temperature sensitive means in a preferred embodiment can be integral with the temperature indicator, providing a temperature sensitive indicator. Such a temperature sensitive indicator can, for example, comprise at least one chemical sensor which changes color if its temperature exceeds a predetermined level. In other embodiments the indicator can incorporate a plurality of such chemical sensors, each of which is adapted to change color at a different predetermined temperature. Such embodiments of the device could give a more exact indication of the temperature, and temperature changes, across the barrier.

The conductor can be made from any suitable thermal conductive material and can take a variety of forms adapted for individual applications. For instance, where the device is to be fitted to a door or wall, etc., the conductor can be cylindrical. In a preferred embodiment of the invention the conductor can be tubular and a lens can be provided at each end of the tube so that the device can also function as a peephole in a similar manner to conventional peepholes fitted to doors.

In an alternate embodiment of the invention the device can include a second temperature indicator for location on the surface of the opposite second side of the barrier for indicating a change in temperature at the first side of the barrier in response to heat transferred along the conductor to a second temperature sensitive means associated with the second indicator. The second temperature sensitive means and the second indicator can be of the same type as the first temperature sensitive means and the first indicator.

DESCRIPTION OF THE PREFERRED EMBODIMENT(S)

Figure 1:
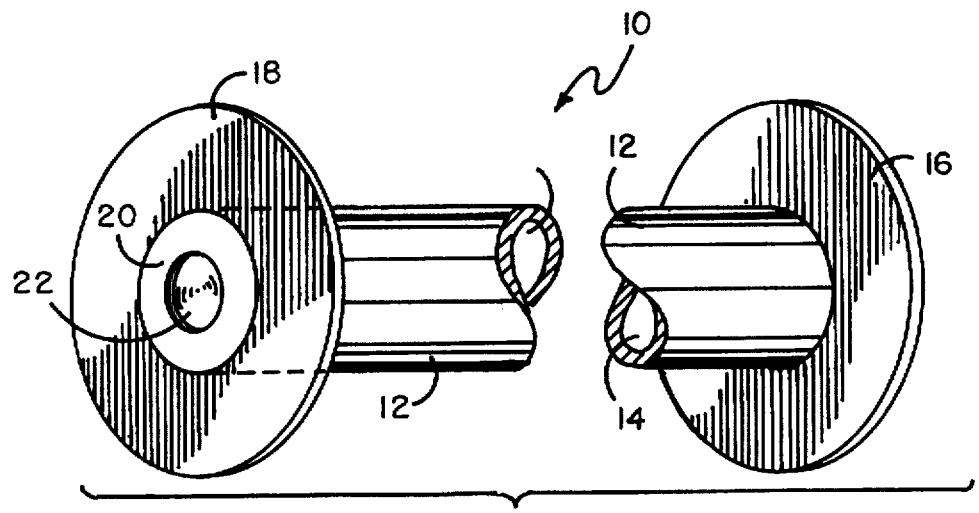
FIG. 1 illustrates a perspective view of the device of this invention.
Figures 2, 4:
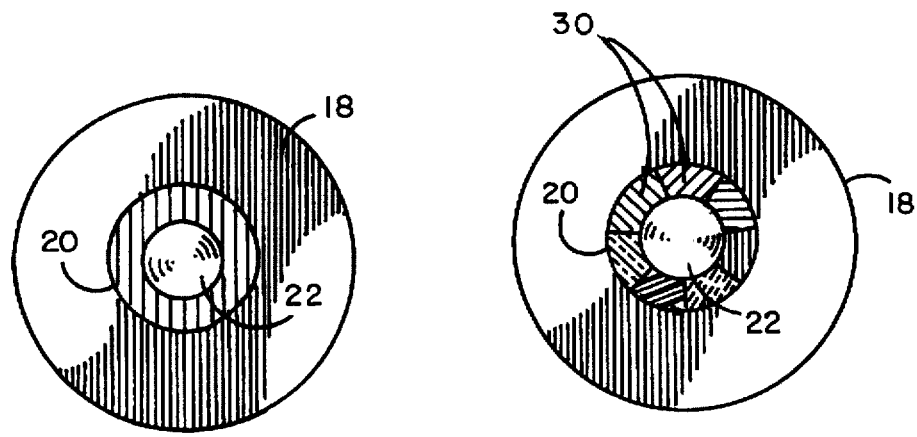
FIG. 2 illustrates an end elevational view of the device of FIG. 1, showing a change in the color of the temperature indicator due to an increase in temperature above a predetermined level.
FIG. 4 illustrates an end elevational view of the device of FIG. 2 with multiple color change areas on the temperature indicator.

Referring to FIG. 1, the illustrated device 10 comprises first and second disk-shaped temperature sensitive indicators 16 and 18, joined axially to respective ends of metal tube 12 which serves as the thermal conductor. First and second indicators 16 and 18 each include central ring 20 of a temperature sensitive chemical which changes color if its temperature exceeds a certain level. Such chemical temperature sensors are widely used and readily available and so will not be described in further detail here. With the particular embodiment illustrated, the ring is not visually distinctive until it exceeds the predetermined temperature level, which level can vary from sensor to sensor depending on the application to which the device is to be put. Thus the ring is not shown in a dark shade in FIG. 1. Central ring 20 however is shown in FIG. 2 as it would appear once it has changed to a darker color.

Figure 3:
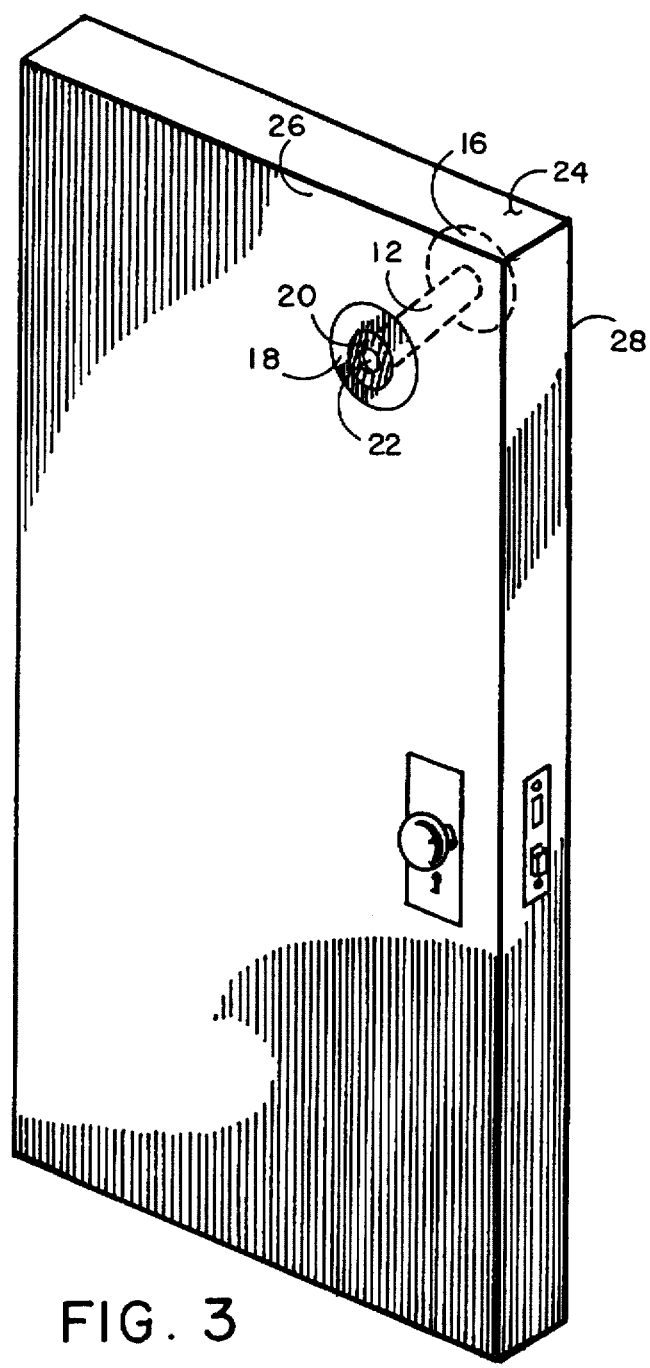
FIG. 3 illustrates a perspective view of the device of FIG. 1 installed in a door.

The device described above is suitable for installation in a door and such installation is illustrated in FIG. 3. In FIG. 3 it will be seen that the only modification to the door required to fit the device therein is to drill a hole through door 26 to receive metal tube 12. To install the device of this invention it is necessary to fit at least one of first and second indicators 16 and 18 to tube 12 after it has been inserted through the hole in door 26.

In use, the device functions by conducting heat from each side of the door to the indicator located on the opposite side of the door. Thus, if the temperature on one side of the door exceeds the predetermined level, such level detected by the nature of chemical central ring 20, the sensor on the opposite side of the door will indicate this situation. The device allows one to observe a gross temperature change on the opposite side of the door. Heat is not transferred through the thermal conductor independently from one room to the other. The device is primarily used for fire detection. If one is standing in a room of normal temperature which would not in itself not cause a color change in the device and if there were a fire in the adjacent room which caused the temperature in the adjacent room to exceed the predetermined temperature level for color change such as, for example 125 degrees F., then the observer in the room-temperature room would observe the color change and know that the adjacent room was extremely hot and possibly on fire. Such color change will occur in the device irrespective of the lower temperature in the room in which the observer of the color change is in. The device does not determine the relative temperature between the two rooms but is useful when there is an extreme difference in temperature which causes a color change to occur in the indicator located in the room that is not of higher temperature.

As a modification of the device described above, an appropriate lens can be installed in each indicator in the center 22 of each central ring 20 so that the device can also function as a conventional peephole.

FIG. 4 illustrates second temperature sensitive indicator 18 with multiple color change areas 30, each to change color for a different predesignated temperature. First and second temperature sensitive indicators 16 and 18 can have writing, not illustrated, disposed around central ring 20 stating, for example, "If circle is black, do not enter."

Although the present invention has been described with reference to particular embodiments, it will be apparent to those skilled in the art that variations and modifications can be substituted therefor without departing from the principles and spirit of the invention.

We claim:

1. A temperature-indicating device for use with a barrier having a first side and an opposite second side, comprising in combination:

aperture defined in said barrier;

at least one temperature sensitive indicator having at least one chemical sensor which changes color when its temperature exceeds a predetermined level, said temperature sensitive indicator disposed on said first side of said barrier;

a thermal conductor having first and second ends disposed, respectively, between said first side of said barrier and said second side of said barrier and within said aperture, said thermal conductor joined axially at its first end to said temperature sensitive indicator and having its second end disposed at said second side of said barrier, said thermal conductor transferring heat from said second side of said barrier to said temperature sensitive indicator, and wherein said temperature sensitive indicator indicates a change in temperature as conducted by said thermal conductor, said temperature sensitive indicator indicating on said first side of said barrier that the temperature on said opposite second side of said barrier has exceeded said predetermined level.

2. The combination of claim 1 wherein said temperature sensitive indicator further includes a plurality of said chemical sensors each of which is adapted to change color at a different predetermined temperature.

3. The combination of claim 2 further including:

a second temperature sensitive indicator disposed at said second side of said barrier joined axially at said second end of said thermal conductor, said second temperature sensitive indicator indicating a change in temperature conducted through said thermal conductor and indicating on said second side of said barrier that the temperature on said first side of said barrier has exceeded a predetermined level, said second temperature sensitive indicator further including a plurality of chemical sensors, each of said chemical sensors adapted to change color at a different predetermined temperature.

4. The combination of claim 3 wherein said thermal conductor has a tubular shape.

5. The combination of claim 4 further including a first lens and a second lens, said first and second leases positioned, respectively, at said first and second ends of said tubular thermal conductor so as to function as a people.

6. The combination of claim 1 wherein said thermal conductor has a tubular shape.

7. The combination of claim 6 further including a first and second lens positioned, respectively, on said first and second ends of said tubular thermal conductor so as to function as a peephole.

8. The combination of claim 1 further including:

a second temperature sensitive indicator disposed at said second side of said barrier joined axially at said second end of said thermal conductor, said second temperature sensitive indicator indicating a change in temperature conducted through said thermal conductor and indicating on said second side of said barrier that the temperature on said first side of said barrier has exceeded a predetermined level.

* * * * *